United States Patent [19]
Taylor

[11] Patent Number: 5,538,761
[45] Date of Patent: Jul. 23, 1996

[54] PROCESS FOR PREPARING BINDER-TREATED FIBERGLASS EXHIBITING LOWERED FORMALDEHYDE AND AMMONIA EMISSIONS AND PRODUCT PREPARED THEREBY

[75] Inventor: Thomas J. Taylor, Englewood, Colo.

[73] Assignee: Schuller International, Inc., Denver, Colo.

[21] Appl. No.: 490,034

[22] Filed: Jun. 13, 1995

[51] Int. Cl.⁶ .................................................. B05D 3/02
[52] U.S. Cl. .................. 427/389.8; 427/421; 528/139; 528/146; 528/164
[58] Field of Search .................. 528/129, 137, 528/139, 145, 146, 164; 427/389.7, 389.8, 421

[56] References Cited

U.S. PATENT DOCUMENTS

| | | | |
|---|---|---|---|
| 3,039,981 | 6/1962 | Shannon et al. | 260/29.3 |
| 3,616,179 | 10/1971 | McCombs et al. | 161/170 |
| 3,701,743 | 10/1972 | Horowitz et al. | 161/262 |
| 3,819,441 | 6/1974 | Fargo et al. | 156/167 |
| 4,036,816 | 7/1977 | Vasishth et al. | 260/59 R |
| 4,202,959 | 5/1980 | Henbest et al. | 528/254 |
| 4,400,492 | 8/1983 | Asano et al. | 528/139 |
| 4,757,108 | 7/1988 | Walisser | 528/64 |
| 5,358,748 | 10/1994 | Mathews et al. | 528/145 |
| 5,362,842 | 11/1994 | Graves et al. | 528/262 |

*Primary Examiner*—Shrive Beck
*Assistant Examiner*—Erma Cameron
*Attorney, Agent, or Firm*—Cornelius P. Quinn

[57] ABSTRACT

Emissions of formaldehyde and ammonia from urea-extended alkaline phenol/formaldehyde resole fiberglass binders are sharply reduced by using as a catalyst an emission-reducing effective amount of an acidifying agent which is a hydrolyzable inorganic salt, mineral acid, monomeric carboxylic acid or partial ester of a polycarboxylic acid such that the instantaneous pH of the binder solution is lower than 5.5. Use of the catalysts of the subject process also allow for additional urea-extension without degradation of fiberglass product physical properties. The preferred catalyst is aluminum sulfate in an amount of from 2.0 weight percent to about 4.0 weight percent based on the resin solids.

11 Claims, No Drawings

5,538,761

1

PROCESS FOR PREPARING BINDER-TREATED FIBERGLASS EXHIBITING LOWERED FORMALDEHYDE AND AMMONIA EMISSIONS AND PRODUCT PREPARED THEREBY

TECHNICAL FIELD

The subject invention pertains to a process for preparing binder-coated fiberglass whereby emission of formaldehyde and ammonia are reduced. More particularly, the subject invention pertains to a reduced formaldehyde/ammonia emission process for preparing fiberglass utilizing urea-extended phenol/formaldehyde binders.

BACKGROUND ART

Fiberglass comes in many shapes and sizes and can be used for a variety of applications. A general discussion of fiberglass manufacturing and technology is contained in *Fiberglass* by J. Gilbert Mohr and William P. Rowe, Van Nostrand Reinhold Company, New York 1978, which is herein incorporated by reference. During the preparation of fiberglass, whether by a blown fiber or continuous filament manufacturing process, the resulting glass fibers may easily be degraded in their strength characteristics by the self-abrasive motion of one fiber passing over or interacting with another. As a result of this self-abrasion, surface, defects are caused in the fiberglass filaments resulting in reductions in overall mechanical strength. Furthermore, fiberglass which is destined for use as building insulation and sound attenuation is often shipped in a compressed form to lower shipping costs. When the compressed bundles of fiberglass are utilized at the job site, it is imperative that the fiberglass product recover a substantial amount of its precompressed thickness. Otherwise, loss of insulation and sound attenuation properties may result.

Traditionally, fiberglass has been treated with phenol/formaldehyde resole binders to alleviate the previously-mentioned defects. The phenol/formaldehyde binders utilized in the past have been the highly alkaline resole type which have the combined advantages of inexpensive manufacture and water solubility. Typically, the binders are applied to the fiberglass from aqueous solution shortly after the fibers have been produced, and cured at elevated temperature in a curing oven. Under the curing conditions, the aqueous solvent is evaporated, and the phenol/formaldehyde resole cures to a thermoset state. The fibers in the resulting fiberglass product are thus partially coated with a thin layer of thermoset resin, which tends to accumulate at the junctions where fibers cross each other. The resulting product therefore not only suffers from less self-abrasion, but also exhibits higher recovery than a fiberglass product not incorporating a binder.

The alkaline phenol/formaldehyde resoles contain a fairly large excess of formaldehyde from the manufacturing process. This excess of formaldehyde has been taken advantage of by adding urea to the phenol/formaldehyde resole, resulting in a urea-extended resole. Urea-extended phenol/formaldehyde binders are more cost-effective than the straight phenol/formaldehyde resins, but exhibit some loss in properties as the urea content increases.

The urea added in urea-extended phenol/formaldehyde binders serves the dual purpose of increasing useable solids content at minimal cost as well as lowering formaldehyde emissions during application of aqueous solutions to fiberglass from the spinning process as well as during elevated cure to the thermoset state. The amount of urea which can be added to the phenol/formaldehyde resin is limited, however.

If the amount of urea added is too high, the performance of the product, particularly with respect to recovery from compression and rigidity, and especially after storage under humid conditions, will be decreased. The amount of urea-extension possible is generally limited to a maximum of approximately 70:30 phenol/formaldehyde solids to urea for this reason. It would be desirable to be able to increase the amount of urea without sacrificing physical properties of the fiberglass product, as urea is considerably less expensive than the phenol/formaldehyde resin itself.

Traditional alkaline phenol/formaldehyde resole resins are manufactured with a large excess of formaldehyde to lower residual phenol to low levels and to insure complete water solubility of the product. Addition of urea to such a product causes a complex reaction in which many polymeric species are produced, both through reaction of urea with methylolated phenols, formation of methylolated ureas followed by reaction with the phenol/formaldehyde resin, and formation of urea/formaldehyde polymeric species. As the amount of added urea approaches the amount of excess formaldehyde on a stoichiometric basis, formaldehyde emission levels drop appreciably. However, formaldehyde is still emitted, even at 1:1 stoichiometry. Moreover, as formaldehyde levels decrease, ammonia emissions increase. Adding urea above that required on the basis of stoichiometry lowers formaldehyde emissions even more, but increases ammonia emissions and moreover, causes an intense amount of "blue smoke" which makes this larger amount of urea unusable, even where increased ammonia emissions can be tolerated. It would be desirable to increase the amount of urea which can be utilized to extend alkaline phenol/formaldehyde resole resins without increasing ammonia emissions and without increasing "blue smoke."

Phenol/formaldehyde resole resins are generally alkaline. Acid catalyzed novolac resins have been used to prepare binder compositions, but their use is problematic, as the novolac resins are not sufficiently water soluble and must be used as dispersions. For example, U.S. Pat. No. 3,956,204 discloses anti-punking resins prepared from phenol and less than equimolar formaldehyde under acidic conditions, where large quantities of 2,2'- and 2,4'-dihydroxydiphenylmethanes are produced. Following resin preparation, a nitrogenous substance is reacted in and the composition is optionally extended with urea following which the pH is adjusted to between 7 and 8 prior to application to the fiberglass and subsequent cure.

U.S. patent application Ser. No. 07/574,014, a copy of which is available from NTIS, discloses the preparation of phenol/formaldehyde resins employing low levels of excess formaldehyde and an amino-functional co-reactant which may be urea or a substituted urea, under acidic conditions employing aluminum sulfate or mineral acid as a catalyst in resin preparation. However, although the resin synthesis takes place under acidic conditions, the resin is neutralized prior to cure. The resin is stated to be useful for preparing particle board and other wood products. However, the products do not appear suitable for application to fiberglass as a binder.

U.S. Pat. No. 3,701,743 discloses a modified urea/formaldehyde resin as a plywood adhesive, prepared by blending together a urea/formaldehyde resin and a minor amount of a phenol/formaldehyde resin, together with an amylaceous extender, and curing in the pH range of 5–7. Aluminum sulfate in an amount of approximately 1% based on total solids is the preferred curing agent, and is said to eliminate bleed-through of the resin through the surface veneer. The use of an amylaceous extender raises the potential for microorganism growth, and the high proportion of urea/formaldehyde resin renders the composition unsuitable for application to fiberglass.

In U.S. Pat. No. 3,039,981 is disclosed a metallized phenol/formaldehyde resin prepared by combining a phenolic resin with aluminum sulfate or other ionic metal compound at elevated pH, following which the insoluble resin is emulsified with mineral oil and applied to fiberglass.

Great Britain Patent No. GB 2245578 discloses the co-use of ammonium sulfate and aluminum sulfate in the cure of phenol/formaldehyde resins and other formaldehyde resins. No urea-extended resins are disclosed. The reference indicates that aluminum sulfate alone is unsatisfactory. A separate curing solution containing ammonium sulfate, aluminum sulfate, and a sufficient minor amount of urea to prevent precipitation of the less soluble ammonium aluminum sulfate inner salt is suggested. The amount of catalyst solution ranges from 5% to 10%, which correlates to an aluminum sulfate content in the uncured resin of about 0.7% to 1.3% by weight.

Ammonium sulfate has been used as a latent catalyst in the cure of phenol/formaldehyde binders. Ammonium sulfate is the salt of a strong acid and weak base and therefore hydrolyses in aqueous solutions to produce an acidic solution. However, when added to an alkaline phenol/formaldehyde resole, the solution remains basic due to the initial alkalinity. The ammonium ion can react with excess formaldehyde to form hexamethylene tetramine and sulfuric acid, thus further lowering the pH. However the pH drops only to about 6.5 during this process, and importantly is both time and free formaldehyde dependent. Thus, addition of ammonium sulfate to alkaline resoles for use as a catalyst may produce varied results depending upon both the initial free formaldehyde content of the resin as well as the time the catalyzed resin is allowed to stand prior to use.

It is an object of the subject invention to reduce formaldehyde and ammonia emission levels in a process for coating fiberglass with a urea-extended phenol/formaldehyde binder solution.

It is a further object of the invention to enable the use of higher levels of urea in urea-extended phenol/formaldehyde fiberglass binder solutions without experiencing a loss in physical properties of the fiberglass product.

SUMMARY OF THE INVENTION

The present invention pertains to a process for the preparation of binder-coated fiberglass employing aqueous, urea-extended, alkaline phenol/formaldehyde resins, wherein emissions of formaldehyde and ammonia are reduced. The invention contemplates the use of an acidifying hydrolyzable salt, mineral acid, or partial ester of a polycarboxylic acid to lower the instantaneous pH of the urea-extended prereact binder solution to a pH of less than 5.5, coating fiberglass with the acidified resin prereact, and curing, whereby the levels of formaldehyde and/or ammonia emissions are reduced. The subject invention further pertains to a process as described above, wherein the amount of urea is increased over that ordinarily used without significant decrease in the physical properties of the finished fiberglass product.

DETAILED DESCRIPTION OF THE PREFERRED EMBODIMENT

Fiberglass insulation, sound attenuating products, and other related products are conventionally prepared as a random mat product bonded together by a cured thermoset binder. Molten glass streams are drawn into fibers by a spinnerette or bushing and blown onto a traveling conveyor. The fibers, while still hot and in transit to the conveyor, are sprayed with aqueous binder, during which time the majority of water present in the binder evaporates. The mat is then passed through a curing oven where the fiberglass binder cures to a thermoset state. The fiberglass is then compressed for shipping.

The aqueous binder solutions of the present invention are prepared by extending an alkaline phenol/formaldehyde resole containing an excess of formaldehyde with urea to form a "prereact" and adding an amount of acidifying agent to lower the instantaneous pH of the solution to about 5.5 or lower. The resulting binder composition may be utilized as is, or may be diluted with sufficient water so as to provide the desired solids level when sprayed or wet-immersed onto fiberglass products. Traditionally, phenol/formaldehyde binders are utilized in a solution containing approximately 3% to 20% solids by weight, and sprayed onto fiberglass in order to achieve a solids content of from 0.5% to about 15% by weight of the finished fiberglass product. Depending upon such factors as the binder efficiency and the desired end use application, the amount of binder may be increased or decreased as necessary. For building insulation, for example, a range of binder content between 3% and 7% by weight is common. Such binder contents are generally produced employing a binder solution containing from 10% to 20% solids by weight. The adjustment of the solids content of the binder solution and determination of the desired binder content of the finished fiberglass product can be readily accomplished by those of ordinary skill in the art.

The starting material for the aqueous binders of the subject invention is an alkaline phenol/formaldehyde resole prepared using excess formaldehyde in order to ensure water solubility. By the term "excess formaldehyde" is meant an amount of formaldehyde substantially in excess of an equimolar amount with respect to phenol, preferably an amount such that the formaldehyde/phenol mole ratio is from 2:1 to about 7:1, more preferably from 2:1 to 4:1. Such resoles are to be distinguished from phenol/formaldehyde condensates which are prepared under acidic conditions, or with low levels of formaldehyde, in which case significant quantities of dihydroxydiphenylmethanes are produced. Such products are generally not water soluble.

Preparation of alkaline resoles is within the expertise of one of ordinary skill in the art. The procedure usually entails reaction of phenol and formaldehyde on the basis of one mole of phenol for each approximately two to four moles of formaldehyde, in the presence of a basic catalyst. The formaldehyde is conveniently added as a formalin solution containing from 30 to 50% by weight of formaldehyde. The resulting alkaline resole is water soluble by virtue of containing large quantities of methylolated phenol residues, and generally contains from 30 to 60 weight percent solids, preferably about 50 weight percent solids. The amount of solids is assessed by standard industry methods, for example the standard oven solids test. Such products can be manufactured in situ, or can be purchased, as they are available commercially. An example of the latter is Neste 368ST resin, containing nominally 48 weight percent solids by the oven solids test, a pH within the range of 7.5 to 8.3 and available from the Neste Corporation. The alkaline resoles should contain sufficient formaldehyde to react with the urea to be added on an approximately one-to-one molar basis.

A urea-extended alkaline prereact containing initially 70 parts of phenol/formaldehyde resin solids which is reacted with 30 parts by weight of urea is utilized to form what is known as a 70/30 extended binder. In order to react with this amount of urea, the phenol/formaldehyde resin must generally contain about 10% by weight of free formaldehyde. Commercial resins containing less than this amount can be adjusted by adding the requisite amount of formaldehyde to the as-supplied resin. Other prereacts employing different ratios of phenol/formaldehyde solids to urea are possible, for example, 50/50 and 90/10 extended binders. The free formaldehyde content should be substantially equimolar relative to added urea and thus may range from 0.75 mole to in excess of one mole based on the amount of urea to be added to extend the resole. Preferably a substantially 1:1 ratio of formaldehyde to urea is used. While high amounts of formaldehyde are feasible, such higher levels are not desirable as they both increase product cost as well as resulting in higher formaldehyde emissions upon cure. A ratio of free formaldehyde to urea of from 0.8:1 to 1.2:1, more preferably, 0.8:1 to 1:1 is particularly suitable. Following addition of the urea, the composition is allowed to stand, generally overnight, and is termed a "prereact."

The prereact thus prepared is then acidified to an instantaneous pH of less than about 5.5. By "instantaneous pH" is meant a pH measured within a short time, i.e. as soon as is practically feasible, in particular less than one hour after addition of the acidifying agent. Preferred acidifying agents are inorganic salts which hydrolyze to acidic solutions, strong mineral acids, and monomeric carboxylic acids and carboxylic acid group-containing esters of polycarboxylic acids. By the term "emissions-reducing effective amount" is meant an amount of acidifying agent such that ammonia emissions, formaldehyde emissions, or both emissions are reduced relative to the same binder composition not employing the acidifying agent but employing 2 weight percent ammonium sulfate as a catalyst instead.

Preferred inorganic salt acidifying agents are aluminum sulfate and aluminum chloride, particularly the former. Aluminum sulfate is preferably added in the form of an aqueous solution prepared from aluminum sulfate octadecahydrate. The amount of acidifying hydrolyzable inorganic salt should be such that the binder solution, at its use-concentration of solids, has a pH of about 5.5 or less. With binders having a nominal 20 weight percent solids level as determined by the ovens solids test, for example, an amount of aluminum sulfate, calculated on the basis of the octahydrate relative to total resin solids, of greater than 1.5 weight percent up to about 4 weight percent has proven effective. Surprisingly, amounts of aluminum sulfate of less than about 1.5 weight percent cause an increase in both formaldehyde and ammonia emissions, while amounts greater than about 4 weight percent cause a decrease in the physical properties of the cured fiberglass product.

Preferred strong mineral acids include hydrochloric acid and sulfuric acid. Preferred partial esters of polycarboxylic acids include the monoalkanol esters of maleic and fumaric acids as well as the monoalkanol esters of acids such as butanedioic acid and adipic acid. Mono- and diesters of tricarboxylic acids and other polycarboxylic acids may be used as well. An example of a suitable carboxylic acid is maleic acid.

The preferred pH range of the acidified prereact is less than 5.5, more preferably in the range of 3.0 to 5.0, and most preferably in the range of 4.0 to 5.0 when used as a solution containing nominally about 12 weight percent solids. Higher solids content solutions may advantageously be more acidic than more dilute use-solutions.

Additional amino-group-containing co-monomers other than urea may also be added in minor quantities to the alkaline phenol/formaldehyde resole resin so long as the resulting composition provides a solution rather than a dispersion. Among the amino-group-containing comonomers are biuret, melamine, dicyandiamide, and the like. The quantities of such additional co-monomers used is generally small, i.e. less than 10%, preferably about 4% or less based on phenol/formaldehyde solids. The comonomers, when used, are advantageously added to the phenol/formaldehyde resin along with the urea at the prereact stage, or after the prereact stage.

Although adding urea in an amount in excess of a 70:30 ratio of phenol/formaldehyde solids to urea may generally cause a decrease in the physical properties of the fiberglass product, it has been surprisingly found that urea in excess of this amount, i.e. in the range necessary to form a 60:40 or 50:50 urea extended binder may be added without a significant loss in properties when utilizing the process of the subject invention. Moreover, in contrast with traditional urea-extended binders, where the entire quantity of urea is prereacted, with the present acidified prereact solutions, a significant quantity of urea, i.e. up to about 30% of total urea, may be added to the prereact cold, just prior to use, without significantly affecting product physical properties. The ability to add urea "cold" in this fashion allows one prereact solution to be used for a variety of product lines, each having a different urea content, by metering in the requisite amount of urea just prior to binder application to the fiberglass. It will be appreciated by one skilled in the art that even after extensive prereaction time, some equilibrium level of unreacted urea and formaldehyde will remain, and more so when the formaldehyde to urea ratio is less than 1:1. It is desirable to have some excess unreacted urea to minimize urea-formaldehyde oligomer precipitation.

Because of the unique curing conditions, the cured binders prepared in accordance with the subject invention are of different composition than those prepared conventionally. That this is true is evidenced by the different levels of formaldehyde and ammonia emissions which indicate that the reactions occurring during cure are different from those catalyzed conventionally, i.e. with ammonium sulfate. Moreover, the cured binders are expected to contain moieties derived from the catalyst such as aluminum, sulfate, or reacted in carboxylic acid moieties.

Formaldehyde emissions may be evaluated using a tube furnace consisting of a glass tube approximately 30 cm long and having a 3.54 cm inside diameter, wrapped with nickel-chromium resistance heating wire and surrounded with a vacuum jacket, the internal temperature monitored by a thermocouple contained in a thermocouple well located between the heater wire and the wall of the inside tube. Sample to be evaluated consists of a glass microfiber filter (Whatman 5.5 cm GF/B) inside a carrier consisting of a 3.8 cm long by 1.9 cm diameter Pyrex® glass tube. Approximately 0.5 gram of final binder solution is placed onto the filter material and weighed to the nearest 0.1 mg. The sample support and sample contained therein are placed near the outlet end of the tube furnace and swept with dry air during the tube furnace run.

To monitor formaldehyde, two impingers connected in series downstream from the tube furnace each contain 20 ml of acetonitrile. After each run, the impinger contents are combined and an accurately measured aliquot diluted 1:1 with a solution of 2.50 gram 2,4-dinitrodiphenylhydrazone (2,4-DNPH) in 1000 ml acetonitrile containing 5.0 ml glacial acetic acid to facilitate reaction of the 2,4-DNPH with formaldehyde. The 2,4-dinitrodiphenylhydrazone thus formed is analyzed using High Pressure Liquid Chromatography (HPLC). An aliquot is also analyzed by GC-MS for hexamethylene tetramine. Since the latter is formed by the reaction of amine-containing reactants and formaldehyde, total formaldehyde emission is the sum of the two determinations. For formaldehyde emission determination, the tube furnace is held at 100° C. for ten minutes followed by rapid heating to 200° C. with a hold for ten minutes, simulating both the binder application and curing steps.

Ammonia emissions are measured in a separate run, with the tube furnace held at 200° C. for ten minutes, thus simulating the process in one step. For ammonia determination, 10N sulfuric acid is used as the trapping agent.

COMPARATIVE EXAMPLE 1

A 70/30 urea extended binder was prepared by adding 30 parts by weight of urea relative to 70 parts by weight phenol/formaldehyde solids in a commercial alkaline resole resin, NESTE 368 ST having a nominal pH of 8.3. The urea was allowed to react with the excess formaldehyde in the resin solution overnight. To the prereact was added 2.0 weight percent ammonium sulfate, and the solution diluted to 20 weight percent solids with water. The instantaneous pH of the solution thus prepared was greater than 7. Formaldehyde and ammonia emissions were measured as described previously. The results are presented in Tables I and II.

COMPARATIVE EXAMPLES 2 AND 3

Prereact binder solutions were prepared as in Comparative Example 1, but with 3.0 and 4.0 weight percent ammonium sulfate, respectively. The pH of the solutions were greater than 6.5. Ammonia emissions are presented in Table II.

COMPARATIVE EXAMPLE 4

A prereact binder solution was prepared in Comparative Examples 1–3 but with 1.0 weight percent aluminum sulfate octahydrate. The pH of the prereact solution prior to dilution is approximately 4.5. Formaldehyde and ammonia emissions are presented in Tables I and II, respectively.

INVENTION EXAMPLES 1–3

Prereact binder solutions were prepared as in Comparative Example 4, but the amount of aluminum sulfate octahydrate increased to 2.0, 3.0, and 4.0 weight percent, respectively. Formaldehyde and ammonia emissions are presented in Tables I and II, respectively.

TABLE I

| | Total Formaldehyde Emissions | |
|---|---|---|
| Example | Catalyst/Amount[1] | Formaldehyde, ppm[2] |
| Comp. Example 1 | (NH$_4$)$_2$SO$_4$/2.0 | 2226 |
| Comp. Example 4 | Al$_2$(SO$_4$)$_3$[3]/1.0 | 4364 |
| Inv. Example 1 | Al$_2$(SO$_4$)$_3$/2.0 | 1113 |
| Inv. Example 2 | Al$_2$(SO$_4$)$_3$/3.0 | 1102 |
| Inv. Example 3 | Al$_2$(SO$_4$)$_3$/4.0 | 950 |

[1]Amount in weight percent based on resin solids.
[2]Average of two measurements.
[3]All aluminum sulfate weight percents based on the octahydrate.

Table I illustrates that 2% ammonium sulfate, having a high instantaneous pH, produces a relatively high level of formaldehyde emission. Substitution of aluminum sulfate for ammonium sulfate in Comparative Example 4 reduces the pH of the present invention but is not an effective amount of catalyst as defined herein, as formaldehyde level is actually increased. Invention Examples 1, 2 and 3, however, have both a pH less than 5.5 as well as an effective amount of acidifying agent, and demonstrate an average 53% reduction in formaldehyde emissions as compared with 2.0 weight percent ammonium sulfate.

TABLE II

| | Ammonia Emissions | |
|---|---|---|
| Example | Catalyst/Amount[1] | Ammonia, ppm[2] |
| Comp. Example 1 | (NH$_4$)$_2$SO$_4$/2.0 | 7180 |
| Comp. Example 2 | (NH$_4$)$_2$SO$_4$/3.0 | 6938 |
| Comp. Example 3 | (NH$_4$)$_2$SO$_4$/4.0 | 3528 |
| Comp. Example 4 | Al$_2$(SO$_4$)$_3$[3]/1.0 | 2915 |
| Inv. Example 1 | Al$_2$(SO$_4$)$_3$/2.0 | 1355 |
| Inv. Example 2 | Al$_2$(SO$_4$)$_3$/3.0 | 1503 |
| Inv. Example 3 | Al$_2$(SO$_4$)$_3$/4.0 | 1710 |

[1]Amount in weight percent based on resin solids.
[2]Average of two measurements.
[3]All aluminum sulfate weight percents based on the octahydrate.

Table II illustrates that ammonium sulfate, even at a level of 4.0 weight percent, still gives rise to significant ammonia emissions. Aluminum sulfate, at the 1.0 weight percent level, appears to lower ammonia emissions somewhat, although not appreciably lower than 4% ammonium sulfate. At levels of 2.0, 3.0, and 4.0 weight percent, however, aluminum sulfate provides an average 50% reduction over ammonium sulfate at the 4.0 weight percent level, and approximately an 80% reduction as compared with ammonium sulfate at the 2% level.

COMPARATIVE EXAMPLE 5

A fiberglass binder composition was prepared from the prereact of Comparative Example 1, with the addition of 0.29 weight percent of a silane coupling agent, A1100, available from OSI, Incorporated. The binder contained 2.0 weight percent ammonium sulfate catalyst. The binder solution was diluted to 20 weight percent solids and fogged into 1.5×13×13 inch unbonded fiberglass sheets, these then being cured in a platen press set at 1 inch height for 10 minutes at 200° C. Samples measuring 6×6 inches were cut, compressed to 25% of their original thickness, and held in humidity cabinet at 165° F. and 95% relative humidity for varying lengths of time. The samples were removed, cooled for 30 minutes, released from compression and allowed to recover in thickness for one hour at which time thickness was measured and percent recovery based on initial thickness was calculated. Density was also measured at this time. The samples were then burnt out at 900° F. to determine their loss of ignition (i.e. binder content). The results are presented in Table III.

INVENTION EXAMPLE 4

In a manner similar to Comparative Example 5, fiberglass was treated with a binder containing 2.0 weight percent aluminum sulfate octahydrate instead of ammonium sulfate. Recovery, loss on ignition, and density are reported in Table III.

INVENTION EXAMPLE 5

In a manner similar to Comparative Example 5, fiberglass was treated with a binder containing 2.0 weight percent aluminum sulfate octahydrate. However, following the urea prereact period and just prior to use, additional urea was added to extend the undiluted resin to 59/41 as opposed to the 70/30 extension of Comparative Example 5 and Invention Example 4. Percent recovery, loss on ignition, and density are reported in Table III.

resented about 5 weight % of the finished product. Of that cured binder content approximately 0.2% represented the silane. Catalyst solutions of ammonium sulfate and aluminum sulfate 18 hydrate with varying concentrations were

TABLE III

Recovery Data For Aluminum Sulfate vs Ammonium Sulfate Samples

| Example | Catalyst/Amount | Urea Extension | Recovery after, hours[1] | | | LOI, % | | | Density, lb/cu. ft | | |
|---|---|---|---|---|---|---|---|---|---|---|---|
| | | | 2 | 20 | 70 | 2 | 20 | 70 | 2 | 20 | 70 |
| Comp. Example 5 | (NH$_4$)SO$_4$/2.0 | 70/30 | 80.06 | 66.43 | 62.53 | 5.23 | 5.31 | 5.51 | 0.72 | 0.76 | 0.74 |
| Inv. Example 4 | Al(SO$_4$)$_3$/2.0 | 70/30 | 81.50 | 67.66 | 60.94 | 5.51 | 5.61 | 5.39 | 0.74 | 0.75 | 0.77 |
| Inv. Example 5 | Al(SO$_4$)$_3$/2.0 | 59/41 | 82.56 | 68.58 | 65.29 | 5.49 | 5.35 | 5.28 | 0.72 | 0.78 | 0.80 |

[1]Recovery in percent based on original uncompressed thickness.

Table III shows that urea extended binders cured with aluminum sulfate have essentially no recovery performance difference as compared with similar resin catalyzed by ammonium sulfate, and that aluminum sulfate cured binders can be further extended with urea with no performance decrease.

EXAMPLES 6–9 AND COMPARATIVE EXAMPLE 6

A prereact solution consisting of a standard commercial alkaline phenol/formaldehyde resin fiberglass resin (Neste 368ST) and a urea solution was made up such that the resin to urea ratio was 70/30 on a solids basis. After the normal prereact time of around 18 hours, the approximately 43% solids solution was in-line mixed with a solution containing a catalyst and an appropriate quantity of aminopropylsilane (OSi Incorporated, A1101), and a soft water stream. These components were then delivered to four sets of nine spraying nozzles where they were hydraulically dispersed. The nozzles were arranged in four circles spraying the binders toward the center of the fiberglass from a distance of about 8 inches. The fiberglass was manufactured using a standard fiberglass spinning machine located approximately 12 inches above each circle of nozzles.

The fiberglass production and binder spray rates were kept constant such that the final cured binder content repemployed such that the percentage catalyst within the final cured binder represented the concentrations shown in Table IV. Note that the quantity of aluminum sulfate is expressed in terms of the 18 hydrate form that was used. The final solids content of the binders as sprayed was around 12%. The pH of the aluminum sulfate containing systems was between 4 for the 5% aluminum sulfate level and 5 for the 2% level.

Two fiberglass machines were arranged consecutively with product being collected on open chain conveyor belts. By overlaying product from each fiberglass machine, a low-density fiberglass blanket was produced. This blanket was then passed through a standard curing oven, adjusted to give a 7.5 to 8 inch product height. The fully cured blankets were cut into 48×15.25 inch sections, and stacked and compressed for packaging. After packaging, samples were opened at regular intervals and allowed to recover in thickness. The recovered thickness and rigidity are shown in Table IV. The rigidity was measured using a saw horse.

TABLE IV

Fiberglass Samples With Experimental Catalysts[1]

| Example | Catalyst | One Week Results | | One Month Results | | Three Month Results | |
|---|---|---|---|---|---|---|---|
| | | Thickness | Rigidity | Thickness | Rigidity | Thickness | Rigidity |
| Comp. Example 6[2] | 2% Ammonium Sulfate | 7.00 | 2.84 | 6.75 | 3.33 | 6.87 | 3.40 |
| Example 6 | 2% Aluminum Sulfate | 6.96 | 3.41 | 6.82 | 3.28 | 6.69 | 3.83 |
| Example 7 | 3% Aluminum Sulfate | 6.82 | 3.92 | 6.79 | 4.05 | 6.53 | 4.08 |
| Example 8 | 4% Aluminum Sulfate | 6.99 | 3.76 | 6.84 | 4.00 | 6.43 | 4.21 |
| Example 9 | 5% Aluminum Sulfate | 6.88 | 5.01 | 6.55 | 4.62 | 6.31 | 5.14 |
| Comp. Example 6[3] | 2% Ammonium Sulfate | 6.88 | 4.23 | 6.84 | 4.37 | 6.83 | 4.28 |

[1]All values shown are in inches with thickness being averages of triplicate measurements on 6 representative batts for each sample. The droop values were recorded in triplicate on three representative batts and these averaged for each sample.
[2]Samples taken at the beginning of trial.
[3]Samples taken at end of trial.

The results shown in Table IV indicate that aluminum sulfate in levels up to and including 4% (expressed as the 18 hydrate) are not detrimental to product performance. At a 5% addition level, aluminum sulfate appears to significantly reduce the rigidity of the product. However, formaldehyde and ammonia emissions are still reduced at the 5% aluminum sulfate level, and the loss in properties may be tolerable for some product specifications.

Having now fully described the invention, it will be apparent to one of ordinary skill in the art that many changes and modifications can be made thereto without departing from the spirit or scope of the invention as set forth herein.

What is claimed is:

1. A process for the preparation of binder-treated fiberglass, comprising:
   (a) selecting an aqueous resole resin prepared by reacting phenol with excess formaldehyde under alkaline conditions;
   (b) adding to said aqueous resole resin (a) urea in an amount of from 20 to about 120 parts per 100 parts of resole resin solids and reacting to form a urea-extended prereact containing binder solids;
   (c) acidifying said prereact (b) with an emissions-reducing effective amount of an acidifying agent selected from the group consisting of acidifying hydrolyzable salts, inorganic acids, monomeric carboxylic acids, partial esters of di- or polycarboxylic acids, and mixtures thereof, such that the instantaneous pH is less than 5.5, to form an acidified, aqueous urea-extended binder;
   (d) applying said acidified, aqueous urea-extended binder to fiberglass; and
   (e) curing said binder at an elevated temperature effective to cure said binder to a thermoset state.

2. The process of claim 1 wherein said acidifying hydrolyzable salt, inorganic acid, or mixture thereof is added to said prereact (b) after said reacting of said urea with said phenol/formaldehyde resole resin.

3. The process of claim 1 wherein said amount of urea reacted with said phenol/formaldehyde resole is from 20 to about 80 parts, and following said acidifying, an additional 100 to 40 parts of urea is added just prior to applying said binder to said fiberglass.

4. The process of claim 1 wherein said hydrolyzable acidifying salt is aluminum sulfate in an amount of from 1.5 to about 5 weight percent based on the weight of binder solids.

5. The process of claim 1 wherein said hydrolyzable acidifying salt is aluminum sulfate in an amount of from 1.5 to about 4 weight percent based on the weight of binder solids.

6. The process of claim 1 wherein the binder solids content is about 40 weight percent or more based on total aqueous binder weight and the instantaneous pH is 4.5 or less.

7. The process of claim 1 wherein the binder solids content is about 20 weight percent based on total aqueous binder weight and the instantaneous pH is 5.0 or less.

8. The process of claim 5 wherein the binder solids content is about 40 weight percent or more based on total aqueous binder weight and the instantaneous pH is 4.5 or less.

9. The process of claim 5 wherein the binder solids content is about 20 weight percent based on total aqueous binder weight and the instantaneous pH is 5.0 or less.

10. A process for the preparation of binder-treated fiberglass, comprising:
    (a) selecting an aqueous resole resin prepared by reacting phenol with excess formaldehyde under alkaline conditions such that the resole resin contains from 10 to about 20 mol percent unreacted formaldehyde;
    (b) adding to said aqueous resole resin (a) urea in an amount of from 20 to about 50 parts per 100 parts of resole resin solids and reacting to form a urea-extended prereact;
    (c) acidifying said prereact (b) with an emissions-reducing effective amount of an acid or acidifying hydrolyzable salt such that the instantaneous pH is 5.5 or less to form an acidified prereact;
    (d) adding to said acidified prereact (c) additional urea in an amount of from 30 to about 70 parts by weight based on resole resin solids to form a urea-containing, urea-extended binder;
    (e) applying said urea-containing, urea-extended binder to fiberglass; and
    (f) curing said binder at an elevated temperature effective to cure said binder to a thermoset state.

11. A process for the preparation of binder-treated fiberglass, comprising:
    (a) selecting an aqueous resole resin prepared by reacting phenol with excess formaldehyde under alkaline conditions;
    (b) adding to said aqueous resole resin (a) urea in an amount of from 20 to about 120 parts per 100 parts of resole resin solids and reacting to form a urea-extended prereact;
    (c) acidifying said prereact (b) with an emissions-reducing effective amount of aluminum sulfate in the range of from 1.5 to about 4 weight percent calculated on the basis of aluminum sulfate octahydrate relative to total resin solids such that the instantaneous pH is less than 5.5, to form an acidified, aqueous urea-extended binder;
    (d) applying said acidified, aqueous urea-extended binder to fiberglass; and
    (e) curing said binder at an elevated temperature effective to cure said binder to a thermoset state.

* * * * *